United States Patent
Xiao et al.

(10) Patent No.: US 10,885,027 B2
(45) Date of Patent: Jan. 5, 2021

(54) PROGRESSIVE PROCESSING FOR QUERYING SYSTEM BEHAVIOR

(71) Applicant: NEC Laboratories America, Inc., Princeton, NJ (US)

(72) Inventors: Xusheng Xiao, Cleveland, OH (US); Zhichun Li, Princeton, NJ (US); Mu Zhang, Plainsboro, NJ (US); Guofei Jiang, Princeton, NJ (US); Jiaping Gui, Los Angeles, CA (US)

(73) Assignee: NEC Corporation

( * ) Notice: Subject to any disclaimer, the term of this patent is extended or adjusted under 35 U.S.C. 154(b) by 182 days.

(21) Appl. No.: 15/684,273

(22) Filed: Aug. 23, 2017

(65) Prior Publication Data
US 2018/0060385 A1    Mar. 1, 2018

Related U.S. Application Data

(60) Provisional application No. 62/378,728, filed on Aug. 24, 2016.

(51) Int. Cl.
| | | |
|---|---|---|
| *G06F 16/2453* | (2019.01) | |
| *G06F 21/62* | (2013.01) | |
| *G06F 16/245* | (2019.01) | |
| *G06F 21/57* | (2013.01) | |
| *G06F 16/22* | (2019.01) | |

(52) U.S. Cl.
CPC ...... *G06F 16/24532* (2019.01); *G06F 16/245* (2019.01); *G06F 16/24535* (2019.01); *G06F 16/24545* (2019.01); *G06F 21/57* (2013.01); *G06F 21/6227* (2013.01); *G06F 16/22* (2019.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 5,692,174 A | * | 11/1997 | Bireley | G06F 16/24532 |
| 6,892,196 B1 | * | 5/2005 | Hughes | G06F 16/9535 |
| | | | | 707/754 |
| 7,877,381 B2 | | 1/2011 | Ewen et al. | |
| 2005/0177557 A1 | * | 8/2005 | Ziauddin | G06F 16/217 |
| 2012/0239681 A1 | * | 9/2012 | Zhang | H04L 41/0604 |
| | | | | 707/769 |
| 2016/0357809 A1 | * | 12/2016 | Patel | G06F 16/2272 |
| 2017/0060938 A1 | * | 3/2017 | Kang | G06F 21/6227 |
| 2017/0278012 A1 | * | 9/2017 | Prasad | G06N 20/00 |

OTHER PUBLICATIONS

W. Alink et al., XIRAF—XML-based indexing and querying for digital forensics, Digital Investigation, Sep. 2006, pp. 50-58.
(Continued)

*Primary Examiner* — Hau H Hoang
(74) *Attorney, Agent, or Firm* — Joseph Kolodka (57) ABSTRACT

Methods for querying a database and database systems include optimizing a database query for parallel execution using spatial and temporal information relating to elements in the database, the optimized database query being split into sub-queries with sub-queries being divided spatially according to host and temporally according to time window. The sub-queries are executed in parallel. The results of the database query are outputted progressively.

8 Claims, 6 Drawing Sheets

(56) References Cited

OTHER PUBLICATIONS

B. Ashok et al., DebugAdvisor: A Recommender System for Debugging, ESEC-FSE, Amsterdam, The Netherlands, Aug. 2009.
Jennifer Bevan et al., Facilitating Software Evolution Research with Kenyon, ESEC-FSE, Lisbon, Portugal, Sep. 2005.
Robert Dyer et al., Boa: A Language and Infrastructure for Analyzing Ultra-Large-Scale Software Repositories, 013 35th International Conference on Software Engineering (ICSE), San Francisco, CA, May 2013.
Abram Hindle et al., SCQL: A formal model and a query language for source control repositories, MSR, St. Louis, MO, May 2005.
Sunghun Kim, TA-RE: An Exchange Language for Mining Software Repositories, MSR, Shanghai, China, May 2006.
Chengnian Sun et al., Querying Sequential Software Engineering Data, FSE, Hong Kong, China, Nov. 2014.
Christian Winter et al., Fast indexing strategies for robust image hashes, Digital Investigation, May 2014, pp. S27-S35.
Advanced Search, https://confluence.atlassian.com/display/JIRA/Advanced+Searching, accessed Apr. 19, 2017.

* cited by examiner

FIG. 1

Input: $U_f$: update frequency from user input
$k$: current host
$S_i$: index of first unprocessed event
$M[1,...,n]$: host measurement/prediction
$\Delta E$: latest execution information $(x, y)$
$ep_{max}$: observed maximum event processing rate
$\gamma$: online learning rate

Output: $D$: workload for the subsequent sub-query

1. Initialize $D \leftarrow 0$ and $U'_f \leftarrow U_f$;
2. while more workload needed within $U'_f$ do
3.     $D' \leftarrow 0$;
4.     $isNew \leftarrow$ false;
5.     if $Evt[S_i]$ is in a new host $h_k$ then
6.       $ep, it \leftarrow getEPandIT(M, k)$;
7.       $ep_{max} \leftarrow ep$;
8.       $isNew \leftarrow$ true;
9.       if $it \geq U'_f$ then
10.         $D \leftarrow D + 1 * ep$;     // is workload
11.         $S_i \leftarrow S_i + D$;
12.         return $D$;
13.     else
14.       $ep \leftarrow adaptiveLearning(ep, \Delta E, \gamma)$;
15.       if $ep_{max} \leq \frac{y}{x}$ then
16.         $ep_{max} \leftarrow \frac{y}{x}$;
17.     if $isNew ==$ true then
18.       $D' \leftarrow (U'_f - it) * ep$;
19.     else
20.       $D' \leftarrow U'_f * ep$;
      // regularization
21.     $maxD \leftarrow U'_f * ep_{max}$;
22.     if $D' > maxD$ then
23.       $D' \leftarrow maxD$;
24.     $D_r \leftarrow remainingEvent(M, k)$;
25.     if $D' > D_r$ then
26.       $U'_f \leftarrow U'_f - \frac{D_r}{ep}$;
27.       $D \leftarrow D + D_r$;
28.       $k \leftarrow k + 1$;
29.     else
30.       $D \leftarrow D + D'$;
31.       break;
32. $S_i \leftarrow S_i + D$;
33. return $D$;

PROGRESSIVE PROCESSING FOR QUERYING SYSTEM BEHAVIOR

RELATED APPLICATION INFORMATION

This application claims priority to U.S. Application Ser. No. 62/378,728, filed on Aug. 24, 2016, incorporated herein by reference in its entirety. This application is related to an application entitled "SECURITY MONITORING WITH PROGRESSIVE BEHAVIORAL QUERY LANGUAGE DATABASES," having U.S. application Ser. No. 15/684,325 filed Aug. 23, 2017 and which is incorporated by reference herein in its entirety.

BACKGROUND

Technical Field

The present invention relates to log management and, more particularly, to efficiently querying system monitoring data.

Description of the Related Art

Due to the complexity of modern computer systems and the many software programs that may be installed in a given system, system experts have limited visibility into the behaviors of the system. Application logs provide only partial information about the software's behaviors and therefore can be insufficient for monitoring the behaviors of those programs. Thus, relying solely on application logs can be overly limiting.

Furthermore, collecting data from system-level event audits produces such large amounts of information that searching the information can be difficult and time-consuming. Because multiple queries may be needed to gain an understanding of the state of the system in view of a particular need, searching through such a large amount of data imposes a heavy burden on the system operator.

SUMMARY

A method querying a database includes optimizing a database query for parallel execution using spatial and temporal information relating to elements in the database, the optimized database query being split into a plurality of sub-queries with sub-queries being divided spatially according to host and temporally according to time window. The sub-queries are executed in parallel. The results of the database query are outputted progressively.

A database system includes a query optimizing module that has a processor configured to optimize a database query for parallel execution using spatial and temporal information relating to elements in the database, the optimized database query being split into a plurality of sub-queries with sub-queries being divided spatially according to host and temporally according to time window. A parallel execution module is configured to execute the sub-queries in parallel. A results module is configured to output progressive results of the database query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles provide methods and systems for querying large amounts of log data using a domain-specific query language, referred to herein as Progressive Software Behavioral Query Language (PROBEQL). PROBEQL provides a query syntax that specifies event patterns for software behaviors. A query engine optimizes searches over the logs based on the domain-specific characteristics of the system monitoring data. PROBEQL further reports query results progressively, so that even lengthy searches can provide quick and continuous feedback.

The present embodiments have one application in computer security monitoring, where a PROBEQL system is used to efficiently execute queries dealing with security threats based on monitored system data, providing progressive results to the user when the execution time is long, thereby permitting a user to rapidly adjust query terms in accordance with preliminary results.

Figure 1:
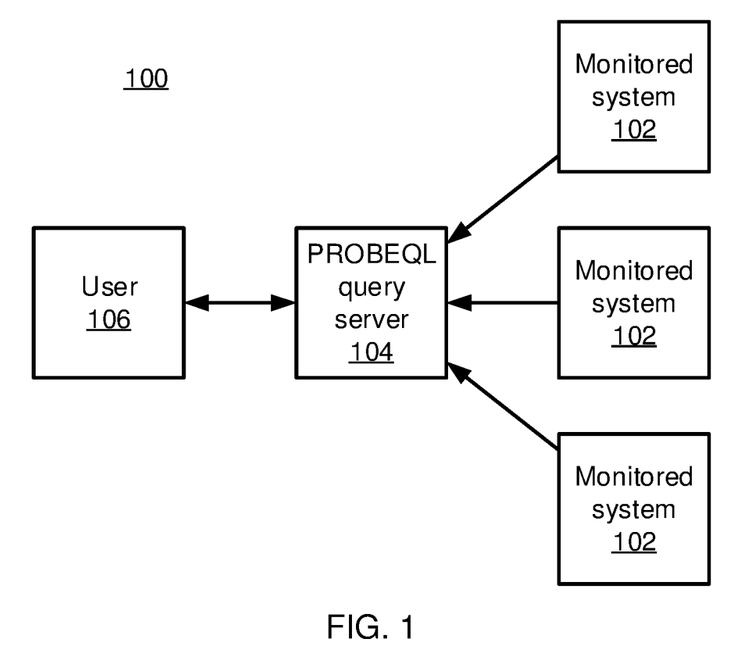
FIG. 1 is a block diagram of a database query system that includes a progressive software behavioral query language (PROBEQL) query server in accordance with an embodiment of the present invention.

Referring now in detail to the figures in which like numerals represent the same or similar elements and initially to FIG. 1, monitoring and analysis system 100 is shown. A set of monitored computer systems 102 may include any appropriate system, including mainframes, desktop workstations, laptops, embedded devices, single-purposes devices, network switches and routers, and any other device that may be part of a computer system or network that runs software and generates logged event information.

The system monitoring data generated by each monitored computer system 102 records the interactions between software programs and system resources as events. Each recorded interaction represents a system event that occurs at a particular host and includes information regarding the initiator of the interaction, the type of interaction, and the target of the interaction. Initiating processes originate from software programs (e.g., a web browser), while targets are system resources, such as files, other processes, and network connections. Each interaction is associated with a timestamp that indicates when the interaction occurred.

To monitor such event information, each monitored system 102 may implement a data collection agent to audit events about system calls. The monitored system calls are mapped to at least three categories of event, including process creation and termination, file accesses, and network accesses. The data may be stored in relational databases that come with mature indexing mechanisms and that are scalable to large amounts of data. The data is stored in partitions based on its temporal and spatial properties, with groups of hosts being separated into table partitions and with databases being dumped periodically (e.g., daily) for temporal grouping.

The logged event information is sent to a PROBEQL query server 104. It should be understood that the PROBEQL query server 104 may be implemented as a standalone device or may, in other embodiments, be implemented as a component within one or more of the monitored computer systems 102. A user 106 interfaces with the PROBEQL query server 104 to perform searches of the stored event information.

In particular, the user 106 creates a PROBEQL query and sends the PROBEQL query to the PROBEQL query server 104. It is specifically contemplated that PROBEQL has a syntax format of {subject-operation-object}, though it should be understood that other syntaxes may be used instead. The PROBEQL syntax specifies an event pattern for software behavior, where software programs are represented as subjects, system resources are represented as objects, and interactions are represented as operations that are initiated by a subject to target an object. An exemplary query is shown below:

host=1//host id
    (from "02/01/2016" to "02/07/2016")//time window
    proc p1 write file f1['/var/log/wtmp'||'/var/log/lastlog']//event pattern
    return distinct p1, f1//result projection
    update 5s//progressive update frequency In this exemplary query, the PROBEQL syntax models software behaviors directly. The query looks for logs where a process p1 (the subject) write (the operation) to one of two files (the objects), returning each distinct pair of subject and object. The query specifies that it is to output its results progressively every five seconds. This allows the user to make changes to the query (e.g., filtering or stopping the query altogether) if the early results show that the query is not providing the information that is needed.

An exemplary partial PROBEQL grammar is set forth below. Although it is contemplated that the PROBEQL parsing system will include these features, it should be understood that the grammar described below may be altered, added to, or removed from as is appropriate to the specific needs at hand:

<probeql>::=(<evt_cstr>)*<query>
    <evt_cstr>::=<cstr>|'('<time_window>')'
    <query>::=<evt_patt>+<return> <progress>?<t_num>?
    <evt_patt>::=<entity> <op_exp> <entity> <evt>?
    <entity>::=<type> <entity_id>? ('['<attr_cstr>']')?
    <return>::='return' 'distince'?<res>(','<res>)*', count'?
    <res>::=<entity_id>('.'<attr_name>)?
    <progress>::='update'<val> <timeunit>
    <t_num>::='using'<val>'worker'

In this grammar, a PROBEQL query includes two major parts: event constraints <evt_cstr>, which specify constraints for hosts and time windows, and event patterns <evt_patt>, which specify subject, objects, operations, and optional event identifiers. The subject and object are specified as <entity> entries, including entity type <type>, an optional entity identifier <entity_id>, and optional attributes. The exemplary query above specifies a process entity p and a file entity f1. The operation <op_exp> specifies the operation initiated by the subject and targeting the object, such as reading a file. Logical operators (e.g., "," for AND, "||" for OR, "!" for NOT, etc.) can be used to combine multiple operations. The event return <return> specifies which attributes of the found events to return. Based on the events' attributes that are specified in the event return rule, the result tuples are output.

The PROBEQL query server 104 receives the PROBEQL query and executes it, optimizing the search based on domain-specific characteristics of the system monitoring data. Each logged system event is generated with a timestamp at a specific monitored system 102. These events exhibit strong spatial and temporal properties, where events in different monitored systems 102 are independent and events within a single monitored system 102 may be independent over time. Based on the spatial and temporal properties of the logged data, at least two types of parallel strategies are contemplated to partition a query into sub-queries, uniformly splitting a time window or workload. The PROBEQL query server executes the sub-queries in parallel.

Even with the sub-queries being executed in parallel and the increase in performance that results, the speed of the query is still limited by the speed of the hardware, and executing a search over a large amount of data will still take a long time. As noted above, progressive updating of query results helps the user 106 make rapid use of incomplete query outputs. Different update frequencies may be appropriate for different types of queries. For example, a query that looks for the existence of a behavior may need a shorter update frequency (e.g., every two seconds), while a query that looks for the exact files that a specific program writes may need only infrequent updates so that more results are collected for analysis.

In a PROBEQL query, the progressive processing clause <progress> specifies the update frequency, while thread number <t_num> specifies the number of worker threads used to execute subqueries. If the update frequency is not specified, the query execution will not report results until the end of the search, allowing the PROBEQL query server 104 to fully leverage the spatial and temporal properties of the system monitoring data to optimize the overall execution time, parallelizing the execution of the PROBEQL query. If the thread number is not specified, the optimal number is inferred based on the number of events to be searched over.

The present embodiments provide at least four strategies for partitioning a workload into sub-queries for execution, each with smaller time windows and fewer involved hosts. The partitioning strategies described below include uniform time window, parallel workload, sequential workload, and sequential workload with initialization cost.

As events in system monitoring data are independent over time, one straightforward partitioning strategy is to uniformly split the time window to each sub-query. This strategy is referred to herein as uniform time window partitioning. However, uniform time window partitioning usually does not split the workload fairly for each sub-query. In practice, hosts often produce events at different rates for different times in the day.

Another set of strategies fall into a category of uniform workload partitioning. A first uniform workload strategy is parallel workload partitioning, where time windows are split into smaller time windows such that the number of events in each time window are the same. A second uniform workload strategy is sequential workload partitioning, which sequentially concatenates the events of all the hosts as an array of events and then divides the array uniformly for each sub-query.

While these two strategies uniformly partition the workload of a query, neither provides the same execution time among all sub-queries due to the initialization cost associated with accessing the data of a host for the first time. Subsequent accesses benefit from caching, reducing or eliminating the initialization cost going forward. Thus, because different sub-queries may have different initialization costs, the execution time may differ.

A third uniform workload strategy is thus sequential workload with initialization cost partitioning, which takes into account the initialization cost for the first access to each host's data. This strategy converts the initialization time to a virtual workload and inserts such virtual workloads into the workloads of each hosts. Sequential workload partitioning is then applied on the combined workloads to provide fair partitions.

In general, sequential workload with initialization cost partitioning performs better than sequential workload partitioning, which performs better than parallel workload partitioning, which in turn performs better than uniform time window partitioning. Parallelism improves query execution time, but there are diminishing returns when more worker threads are used than read/write channels are available in the PROBEQL query server 104.

In addition to partitioning to increase processing speed, to ensure quality in the progressive processing, the PROBEQL query server 104 partitions the query so that new results are reported in every update and so that the overhead is kept low. If no partitioning of the query is performed, a result can only be provided at the end. On the other hand, very frequent updates incur an unacceptably high overhead due to the cost of establishing connections to databases and parsing the sub-queries. To address this problem, some embodiments partition workloads to sub-queries such that each sub-query takes an amount of time equal to or just less than the requested update frequency. The present embodiments therefore employ an adaptive workload partition strategy, dynamically predicting the workloads for subsequent sub-queries based on the latest execution information of already finished sub-queries.

In one scenario, including an enterprise network of one hundred monitored systems 102, a set of commonly used queries for real-world suspicious behaviors were issued over monitored system event data. The time window of the queries was set to cover five days of data (representing about 230 GB of monitored system event data) with various update frequencies (e.g., 5 seconds, 10 seconds, 15 seconds, etc.). The results show that the adaptive workload partition strategy progressively provided the partial results and was 32.8% faster than a regular SQL query. Even compared to the parallel execution of the query without progressive processing and using four worker threads, the overhead of the progressive processing was only 1.2%.

Adaptive workload partitioning furthermore provides execution of sub-queries that have low deviations from the requested update frequencies relative to fixed time window and fixed workload partitioning strategies. Building off sequential workload partitioning with initialization cost partitioning for parallelization, the following partitioning strategies provide adaptive workload partitioning within the sequential workload partitioning with initialization cost framework to provide partitioning strategies that complete sub-queries with an execution time that is close to the requested progressive update frequency.

A first type of adaptive partitioning is fixed time window partitioning. For a query searching for events in n hosts $(h_1, \ldots, h_n)$, in the time window T, the query is based on a fixed time window $T_i$ for events in the host $h_i$. $T_i$ may be computed as $U_f ep_i/g_i$, where $U_f$ is the update frequency, $ep_i$ is the event processing rate of $h_i$, and $g_i$ is the average data generating rate computed using the total events of $h_i$, divided by the time window T.

A second type of adaptive partitioning is fixed workload partitioning. For a query searching for events in n hosts $(h_1, \ldots, h_n)$, the query is partitioned based on a fixed workload $Wd_i$ for events in each host $h_i$. $Wd_i$ may be computed as $U_f ep_i$, where $U_f$ is the update frequency, $ep_i$ is the event processing rate of $h_i$. The initialization costs are considered to be workloads unto themselves in each host.

Both fixed time window partitioning and fixed workload partitioning assume that event processing rates are constant. However, as database systems often employ caches, which greatly speed processing rates for events in the cache, the event processing rate can fluctuate significantly during runtime. The execution time of the sub-queries for both fixed time window partitioning and fixed workload partitioning can be far from the requested update frequency.

To address this, adaptive workload partitioning can dynamically adjust event processing rates during runtime. In particular, online adaptive workload prediction partitioning leverages a set of latest <workload, execution_time> pairs as feedback to learn new event processing rates and to predict workloads for subsequent sub-queries. Gradient descent may be used to guide the adaptive learning.

The goal of learning in online adaptive workload prediction is to adjust the event processing rate obtained in a non-cached environment to fit the latest execution results. A new data processing rate ep and initialization time it are computed that approximate the actual event processing rate in the current running environment. In other words, the local minimum ep', it' are found such that, for each new execution result <x,y>, where x is the execution time and y is the workload, the execution time x' of the next estimated workload y' is closest to the update frequency $U_f$. To compute the gradient g with respect to the new training data set S, a loss function is used where <x,y> are the execution results in S having a size N.

By taking derivatives of the equation:

$$loss(x, y) = \frac{1}{N}\sum_{i=1}^{N}(y_i - (epx_i + it))^2$$

the gradient g is obtained as:

$$g_a = \frac{\partial loss(x, y)}{\partial ep} = \frac{2}{N}\sum_{i=1}^{N} -x_i(y_i - epx_i + it)$$

$$g_b = \frac{\partial loss(x, y)}{\partial it} = \frac{2}{N}\sum_{i=1}^{N} -(y_i - epx_i + it)$$

After computing the gradient, the event processing rate and initialization time are updated as $ep'=ep-\gamma g_a$ and $it'=it-\gamma g_b$, where the learning rate $\gamma$ controls the weight of the latest execution results over the historical results.

To avoid over-fitting, restrictions are placed on the bounds of the newly learned event processing rate ep'. Over-fitting causes the prediction of a large workload, for which the sub-query has no way to return results within the update frequency. The present regularization uses the offline-measured event processing rates as the lower bound. For the upper bound, the instant event processing rate y/x is calculated for each latest execution and the largest observed instant event process rate is used as the upper bound.

Figure 2:
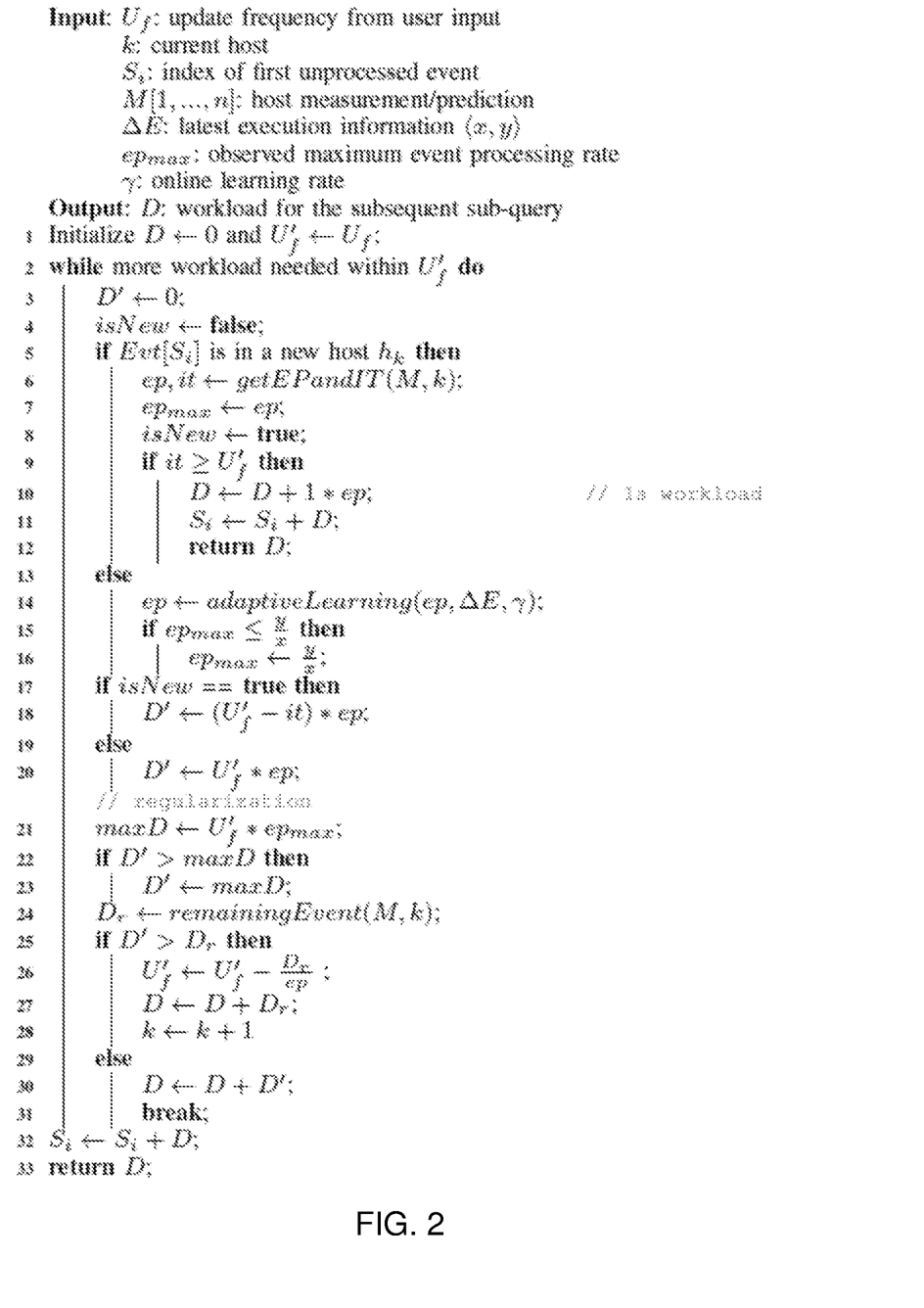
FIG. 2 is pseudo-code representing an online adaptive workload algorithm for splitting queries into sub-queries in accordance with an embodiment of the present invention.

Referring now to FIG. 2, pseudo-code for an online adaptive workload algorithm is shown. Online adaptive workload partitioning follows the structure of sequential workload partitioning with initialization cost by concatenating the events of all involved hosts as an array Evt, concatenating initialization costs as virtual events, and processing the events in the array sequentially. Inputs include the update frequency $U_f$, the current host index k, the index of the first unprocessed event $S_i$ in Evt, the host measurement/prediction M, the latest execution information $\Delta E$, the observed maximum instant event processing rate $ep_{max}$, and the learning rate $\gamma$. The host/prediction M stores the information of the involved hosts' offline measured (or predicted) event processing rates and initialization times.

The algorithm shown in FIG. 2 initializes the predicted workload D to zero and the remaining time within the update frequency $U_f'$ to $U_f$. If $S_i$ indicates that it is the first time the data of host $h_k$ is accessed, the event processing rate ep and the initialization time it are retrieved from M[k]. In this case, if it is larger than $U_f'$, such that even without any workload the execution of the sub-query will not finish within $U_f'$, the default event size is assigned as the predicted workload D and D is returned. If this is not the first time that $h_k$ is accessed, the initialization time is set to zero and adaptive learning is used to learn a new event processing rate. The maximum event processing rate $ep_{max}$ is then updated with the instant event processing rate. Based on ep, the algorithm predicts the workload D'. To avoid over-fitting, regularization is applied to smooth D' if needed.

After regularization, it is determined whether D' exceeds the remaining size of the current host $h_k$. If so, the execution time of the remaining workload in the host is computed and deducted from $U_f'$. A new iteration is started to predict the workload for a new host $h_{k+1}$. Otherwise, the predicted workload D is updated with D' and is returned. The algorithm then updates $S_i$ based on D.

The learning rate $\gamma$ controls the fitting degree of the gradient descent. A learning rate that is selected to be too high or too low causes over- or under-fitting that inaccurately partitions the workload and, hence, makes the average sub-query execution time deviate from the requested update frequency. It has been empirically shown that learning rates of about $\gamma=0.0005$ achieve the best performance in queries with more than twenty sub-queries. It should be understood that this value for the learning rate is purely exemplary and that particular embodiments may benefit from a lower or higher learning rate.

Providing progressive results using online adaptive workload partitioning as described above produces results close to the requested update frequency with a total execution time for queries that is significantly faster than unoptimized execution. Relative to sequential workload partitioning with initialization cost strategies that do not provide progressive results, online adaptive workload partitioning incurs a negligible overhead on total execution time.

Figure 3:
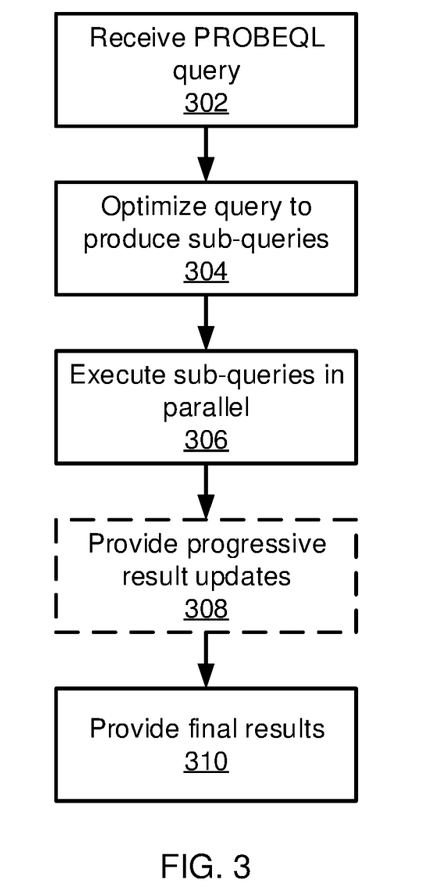
FIG. 3 is a block/flow diagram of a method for optimizing and executing a PROBEQL query in accordance with an embodiment of the present invention.

Referring now to FIG. 3, a block/flow diagram of the execution of a PROBEQL query is shown. Block 302 receives and parses a PROBEQL query from a user 106. As noted above, the PROBEQL query may have a structure that specifies a subject, an operation, and an object, as well as a progressive update frequency. Block 304 optimizes the PROBEQL query for parallel execution, splitting the PROBEQL into multiple sub-queries, taking into account the independence of events that take place across time and across different hosts (e.g., their spatial and temporal properties).

Toward this end, the optimization splits the PROBEQL query according to, e.g., sequential workload partitioning with initialization cost. Block 306 then executes the sub-queries in parallel. If progressive updates are requested in the PROBEQL query, block 308 provides progressive updates of the execution results, with the partitioning of block 306 being directed in particular to an adaptive learning strategy that provides sub-query results on timescales close to the requested update frequency. Once the query execution has completed, with all sub-queries having been executed, block 310 provides the final query results.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
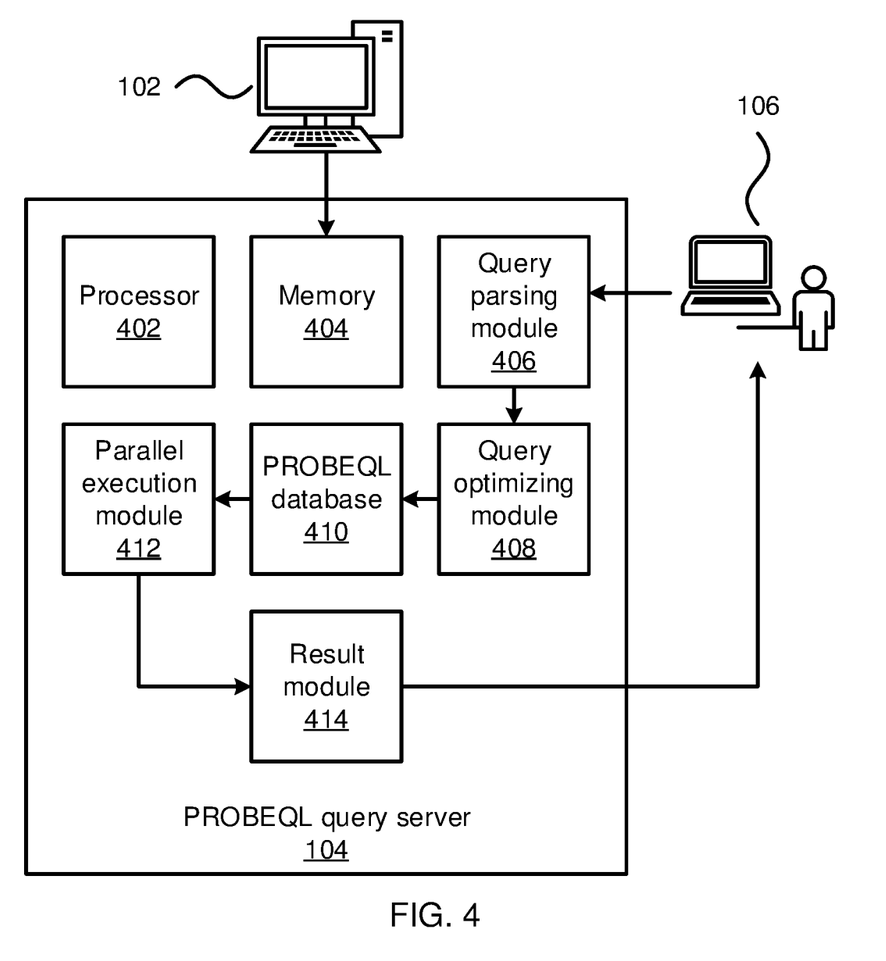
FIG. 4 is a block diagram of a PROBEQL query server in accordance with an embodiment of the present invention.

Referring now to FIG. 4, additional detail on the PROBEQL query server 104 is shown. The PROBEQL query server 104 includes a hardware processor 402 and a memory 404. The hardware processor 402 may be, for example, a single device having multiple processor cores, may be multiple discrete processor devices, or may be a single, unitary processor. The PROBEQL query server 104 further includes functional modules that may, in some embodiments, be implemented as software that is stored in the memory 404 and that is executed by processor 402. In other embodiments, the functional modules may be implemented as one or more discrete hardware components in the form of, e.g., application specific integrated chips or field programmable gate arrays.

A query parsing module 406 receives a PROBEQL query from a user 106 and parses the query according to the PROBEQL grammar, identifying the subject, operation, and object of the query as well as specifying, for example, a progressive update frequency. A query optimizing module 408 then breaks the PROBEQL query into sub-queries that are optimized for parallel execution.

A PROBEQL database 410 is stored in memory 404 as a relational database, storing the information collected from the monitored systems 102. A parallel execution module 412 executes the sub-queries on the PROBEQL database 410 in parallel using processor 402 and/or multiple other processing elements. The execution of each sub-query produces results which may be optionally displayed to the user 106 by result module 414 in a progressive fashion. If progressive results are requested by the user 106, the query optimizing module creates sub-queries that have an expected execution time that is close to the requested progressive result update frequency, such that the result module 414 can display the results of each sub-query as requested.

Figure 5:
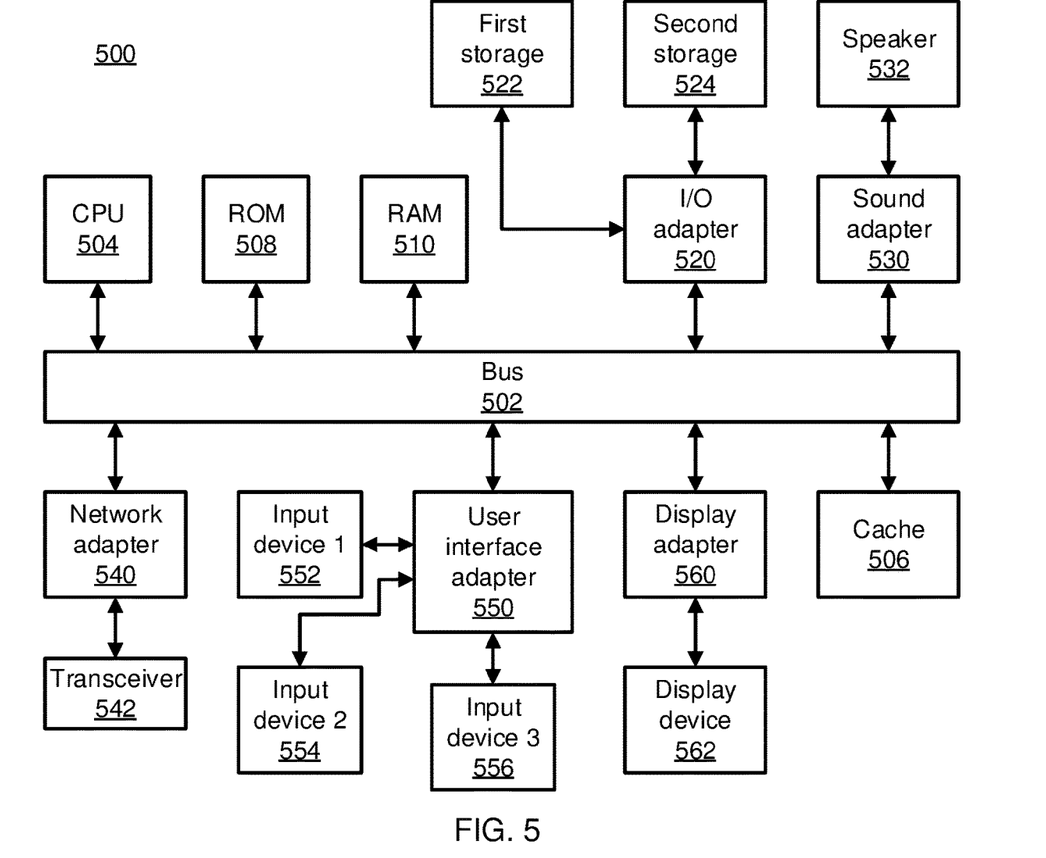
FIG. 5 is a block diagram of a processing system in accordance with an embodiment of the present invention.

Referring now to FIG. 5, an exemplary processing system 500 is shown which may represent the PROBEQL query server 104. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Figure 6:
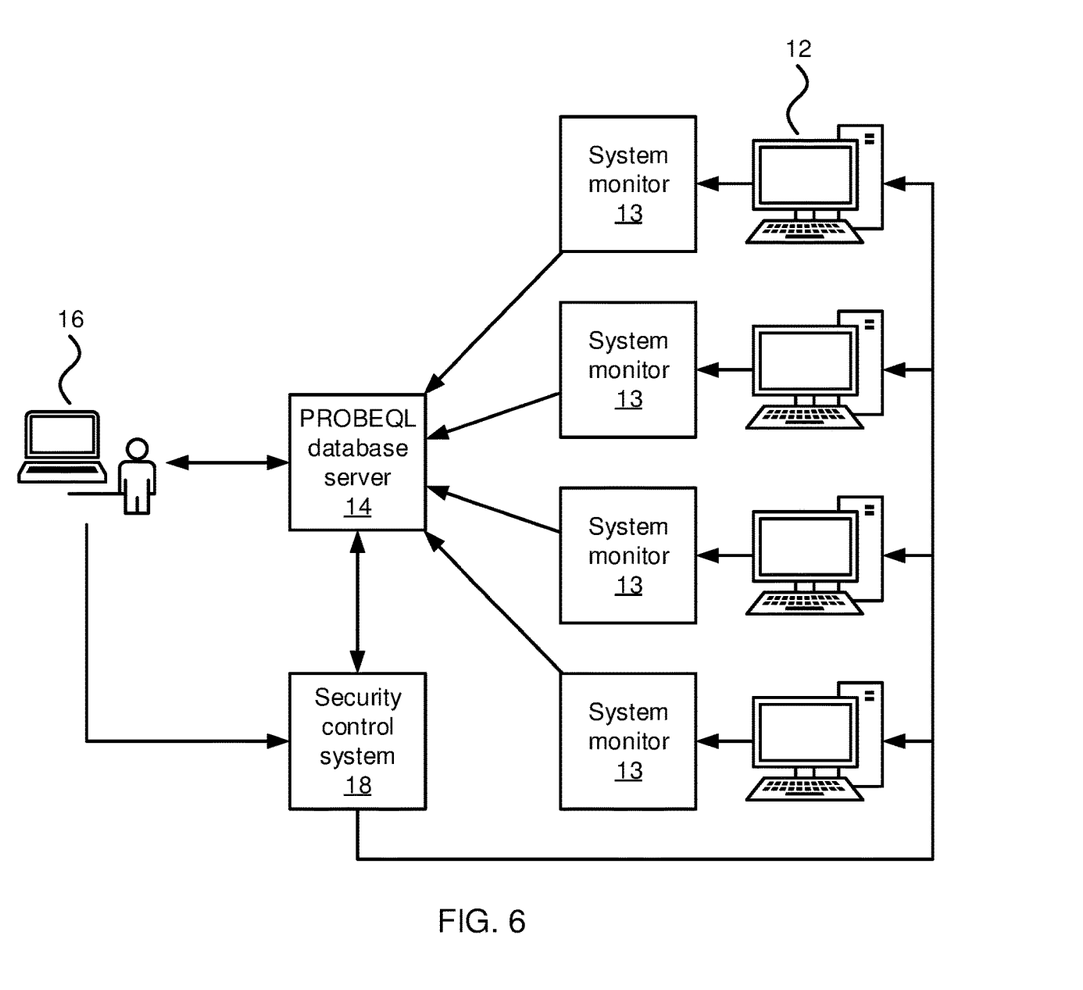
FIG. 6 is a block diagram of an automated computer security system that identifies anomalous behavior and automatically performs a security control action in accordance with an embodiment of the present invention.

Referring now to FIG. 6, an automated computer security system is shown. A set of monitored systems 12, which may for example include desktop computers, servers, individual applications, mobile devices, laptops, etc., are each monitored by one or more system monitors 13 that may represent, for example, software that probe system states, logging systems, physical sensors that measure physical states of the monitored systems 12, etc.

The system monitors 13 output the information they collect to a PROBEQL database server 14. The PROBEQL database server 14 receives PROBEQL queries from a user 16, optimizing the queries for execution across the large volume of collected data and providing progressive results. In another embodiment, an automated security control system 18 can provide queries to the PROBEQL database server 14 that assess particular risks, for example automatically searching for signs of intrusion. These automated queries may be executed periodically or may be triggered by meeting some triggering condition (e.g., the receipt of a security alert or a change in security policies).

The security control system 18 can then use the progressive results provided by the PROBEQL database server 14 to execute a security control action at the monitored systems 12. Examples of security control actions include, for example, changing a security level, powering devices on and off, managing network security policies (e.g., by restricting certain kinds of traffic or access to certain ports), and issuing alerts. The user 16 may also interact with the security control system 18 to manually trigger such security control actions based on the results of the user's PROBEQL queries. By using progressive query results, security control actions can be issued rapidly to respond to ongoing security threats.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for querying a database, comprising:
   optimizing a database query that includes an update frequency for parallel execution using spatial and temporal information relating to elements in the database, by splitting the database query into sub-queries in accordance with a sequential workload partitioning with initialization cost strategy, computing initialization costs as separate workloads for the purpose of partitioning, the optimized database query being split into a plurality of sub-queries that have an expected execution time based on the update frequency, with sub-queries being divided spatially according to host and temporally according to time window;

executing the sub-queries in parallel;

determining actual execution information for executed sub-queries;

adjusting an event processing rate for subsequent sub-queries based on the determined actual execution information for the executed sub-queries; and outputting progressive results of the database query according to the update frequency.

2. The method of claim 1, wherein the database query further comprises a subject, an operation, and an object that the subject operates on.

3. The method of claim 1, wherein outputting progressive results of the database query comprises outputting results from executed sub-queries.

4. The method of claim 1, wherein the sequential workload partitioning with initialization cost strategy is online adaptive workload prediction partitioning.

5. A database system, comprising:

a query optimizing module comprising a processor configured to optimize a database query that includes an update frequency for parallel execution using spatial and temporal information relating to elements in the database, to split the database query into sub-queries in accordance with a sequential workload partitioning with initialization cost strategy, to compute initialization costs as separate workloads for the purpose of partitioning, the optimized database query being split into a plurality of sub-queries that have an expected execution time based on the update frequency, with sub-queries being divided spatially according to host and temporally according to time window, to determine actual execution information for executed sub-queries, and to adjust an event processing rate for subsequent sub-queries based on the determined actual execution information for the executed sub-queries;

a parallel execution module configured to execute the sub-queries and new sub-queries in parallel; and a results module configured to output progressive results of the database query according to the update frequency.

6. The system of claim 5, wherein the database query further comprises a subject, an operation, and an object that the subject operates on.

7. The system of claim 5, wherein the results module is further configured to output progressive results from executed sub-queries.

8. The system of claim 5, wherein the sequential workload partitioning with initialization cost strategy is online adaptive workload prediction partitioning.

\* \* \* \* \*